Aug. 23, 1960   W. RUF   2,950,103
TORSION SPRING DEVICE ON VEHICLES
Filed Oct. 30, 1956
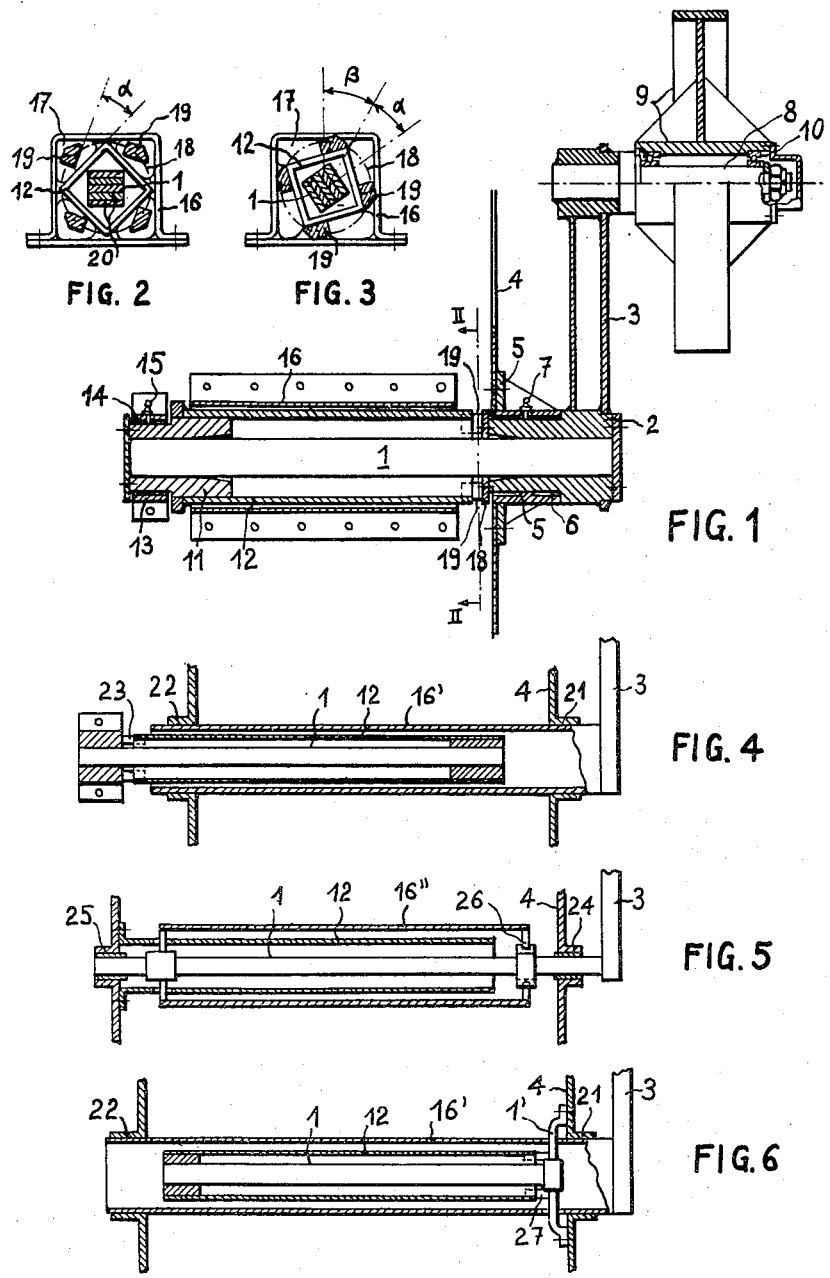

United States Patent Office 2,950,103
Patented Aug. 23, 1960

2,950,103

TORSION SPRING DEVICE ON VEHICLES

Walter Ruf, Landhaus am See, Bottighofen, Switzerland

Filed Oct. 30, 1956, Ser. No. 619,314

Claims priority, application Switzerland Apr. 25, 1956

6 Claims. (Cl. 267—57)

The present invention relates to a torsion spring device on vehicles, characterized in that a torsion spring rod is coaxially built into a prismatic tube, which is sprung in a coaxial, prismatic casing in the direction of turning by means of rubber-elastic inserts arranged in the spaces existing between the two prismatic parts, the said torsion spring rod being rigidly connected at one of its ends to one of the prismatic parts, while a rocking lever is fixed to one of the two coaxial parts which take the tube between them.

The purpose of this arrangement is to be able to obtain big turning angles of the rocking lever, when the angle of twist of the torsion spring rod and the angle of the relative turning between the two prismatic parts add together.

Four embodiments of the object of the invention are fully explained with reference to the accompanying drawing, where:

Fig. 1 shows a horizontal section through a torsion spring device,

Fig. 2 the section II—II in Fig. 1, where the spring device is relieved of load, Fig. 3 the parts as in Fig. 2, but with the spring device fully loaded, and Figs. 4 to 6 show diagrammatically three further embodiments of a torsion spring device.

In the embodiment according to Figs. 1–3 the torsion spring rod 1 is rigidly held at its outer end by a hollow journal pin 2, which on the one hand is rigidly connected to the rocking lever 3 and on the other hand is carried rotatably in the bearing 5, firmly bolted to the vehicle structure 4. This bearing is fitted with bronze bush 6 and lubricating nipple 7. At the free end of the rocking lever 3, a wheel axle 8 is fixed, on which a track wheel 9 of a caterpillar-track vehicle is carried rotatably by means of roller bearings 10. The inner end of the torsion spring rod 1 is held by a second hollow journal pin 11 which on the one hand is rigidly connected to the square tube 12 and on the other hand carried rotatably in the bearing 13, firmly bolted to the vehicle structure. This bearing also has a bronze bush 14 and a lubricating nipple 15. In this manner the torsion spring rod 1 is built coaxially into the tube 12, which for its part is, in a coaxial casing 16 of square cross-section, sprung in the direction of turning by means of rubber inserts 17 arranged in the spaces existing between the tube 12 and the casing 16. The casing 16 is firmly bolted to the vehicle structure.

In order that the torsion spring rod cannot be twisted too severely, the stop plate 18 fixed to the journal pin 2 is provided with four stops 19 which reach over the tube 12. When the torsion spring rod 1 has reached its maximum admissible twist, the stops 19 come to lie against the outer side of the tube 12, as illustrated in Fig. 3. Any over-stressing of the torsion spring rod 1 is thus rendered impossible. The swing of the rocking lever may, however, be still considerably greater than the maximum angle of twist α of the torsion spring rod 1 (see Figs. 2 and 3), since the tube 12 can rotate about its longitudinal axis against the action of the rubber inserts 17 in the casing 16. The maximum admissible relative turning between tube 12 and casing 16 is indicated in Fig. 3 with the angle β. The total possible swing of the rocking lever 3 thus amounts to α+β and is limited by a stop (not shown) fitted on the vehicle structure. Since the force needed for the maximum twisting of the torsion spring rod 1 is considerably less than the force needed for turning the tube 12 in the casing 18 through the angle β, ample provision has been made to prevent the rubber inserts also from being over-stressed.

Consequently, with springing movement of the wheel 9, before reaching the maximum swing of the rocking lever 3 the stops 19 come into contact with the tube 12, which is simply carried around for the remainder of the swinging range through the journal pin 2 and the stops 19. In contrast to the torsion spring rod, the rubber springing between the tube 12 and the casing 16 has no linear characteristic, but a progressive one, which means that the greater the swinging angle, the greater becomes the increase of the force required for a definite increase of the swinging.

With this arrangement, the twist angle of the torsion spring rod 1 and the swinging angle of the tube 12 add together, so that comparatively big movements of the rocking lever are obtained, and consequently big springing paths of the wheel 9.

The torsion spring rod 1 consists of spring-leaves 20 laid on each other (Fig. 2). The rod could, however, be formed also of one piece as round rod.

Fig. 4 illustrates diagrammatically how the same effect is to be obtained also with a somewhat different arrangement of the different parts. Instead of the rocking lever 3 being fixed to the torsion spring rod, it is fitted on the casing 16', which for its part is carried rotatably in the vehicle structure at 21 and 22. With its inner end the torsion spring rod 1 is firmly connected to the vehicle structure, and with its outer end to the tube 12. In order that the twisting of the rod 1 may also be limited here, stops 23 connected to the vehicle structure are provided, which stops can be laid against the outer side of the square tube 12, in order to prevent this tube from turning further. Another stop (not shown) limits the movement of the rocking lever so that, just as in the first embodiment, the rubber springing cannot be over-stressed.

A third example is illustrated diagrammatically in Fig. 5. As in the first example, the torsion spring rod 1 is connected to the rocking lever 3 and is carried rotatably in the vehicle structure 4 at 24 and 25. Instead of being connected with its inner end to the tube 12 (as in the first example), it is fixed to the casing 16" by arms 26 which cooperate with a hub carried by the rod 1, the arms 26 serving as limiting stops for avoiding too severe twisting of the torsion spring 1. The inner end of rod 1 is similarly connected with casing 16". At its inner end the tube 12 is connected to the vehicle structure, this connection and the connection between the rod 1 and the casing 16" being engaged through each other in such a manner that the occurring turning of the casing 16" is not hindered.

Fig. 6 shows diagrammatically the fourth example. As in the case in Fig. 4, the rocking lever 3 is connected to the casing 16' which is rotatably carried in the vehicle structure 4 at 21 and 22. The outer end of the torsion spring rod 1 is connected to the vehicle structure 4 by means of connecting arms 1', the openings allowing unhindered turning of the casing 16'. The inner end of the torsion spring rod is rigidly connected to the square tube 12, which for its part cooperates with stops 27 that are fixed on the connecting arms 1' in order to limit the twist of the rod 1. Here also, as in all the other described examples, the total movement of the rocking lever 3 is limited by a stop (not shown).

It is evident that the casing and the tube need not necessarily be of square cross-section; they might also have another prismatic shape, for instance a triagonal or pentagonal cross-section. Instead of rubber inserts, inserts made of a synthetic substance with rubber-elastic properties could be adopted. It is evident that the torsion spring rod is, in all examples, connected at one of its ends to one of the prismatic parts, while the rocking lever is fixed either to the torsion spring rod or to the casing, i.e. to one of the two coaxial parts which take the tube between them.

What is claimed is:

1. A torsion spring suspension for vehicles including wheel carrying means comprising a rocking lever connected to a wheel and positioned to rock about the torsion axis of the spring suspension, a prismatic casing element, and a prismatic tube element disposed coaxially within said prismatic casing element and defining a space therebetween to provide sufficient clearance for relative rotation of one of said prismatic elements with respect to the other prismatic element about said torsion axis, resilient inserts disposed in the space between said prismatic tube element and said casing element, a torsion spring rod disposed coaxially within said prismatic tube element and connected at one of its ends to only one of said prismatic elements, said rocking lever being connected to one member of a pair defined by said casing and said rod, said inserts being parallel to said rod.

2. A torsion spring suspension for vehicles including, a frame, wheel carrying means comprising a rocking lever connected to a wheel and positioned to rock about the torsion axis of the spring suspension, a prismatic casing element, and a prismatic tube element disposed coaxially within said prismatic casing element and defining a space therebetween to provide sufficient clearance for relative rotation of one of said prismatic elements with respect to the other prismatic element about said torsion axis, resilient inserts disposed in the space between said prismatic tube element and said casing element, and a torsion spring rod disposed coaxially within said prismatic tube element, one end of the torsion spring rod being rotatably supported by said frame and the other end only of said rod being rigidly connected to said tube, said casing being secured to said frame, said inserts being parallel to said rod.

3. A torsion spring suspension for vehicles including, a frame, wheel carrying means comprising a rocking lever connected to a wheel and positioned to rock about the torsion axis of the spring suspension, a prismatic casing element, and a prismatic tube element disposed coaxially within said prismatic casing element and defining a space therebetween to provide sufficient clearance for relative rotation of one of said prismatic elements with respect to the other prismatic element about said torsion axis, resilient inserts disposed in the space between said prismatic tube element and said casing element, and a torsion spring rod disposed coaxially within said prismatic tube element, said casing being rotatably supported by said frame and said rocking lever being connected to one end of said casing, and said torsion spring rod being rigidly connected at only one of its ends to said tube and at the other of its ends to said frame, said inserts being parallel to said rod.

4. A spring device as defined in claim 1, wherein the torsion spring rod consists of spring-leaves laid on each other.

5. A spring device as defined in claim 1, wherein the torsion spring rod consists of a round rod.

6. A spring device as defined in claim 1, wherein stops are provided for limiting the angle of twist of the torsion spring rod.

References Cited in the file of this patent

UNITED STATES PATENTS

| 2,103,590 | Lefevre | Dec. 28, 1937 |
| 2,175,562 | Frohlich | Oct. 10, 1939 |
| 2,257,571 | Rabe | Sept. 30, 1941 |
| 2,712,742 | Neidhart | July 12, 1955 |
| 2,729,442 | Neidhart | Jan. 3, 1956 |
| 2,786,670 | Hammond | Mar. 26, 1957 |
| 2,811,347 | Cass | Oct. 29, 1957 |
| 2,861,796 | Rohr | Nov. 25, 1958 |

FOREIGN PATENTS

| 622,994 | Germany | Dec. 11, 1935 |